UNITED STATES PATENT OFFICE.

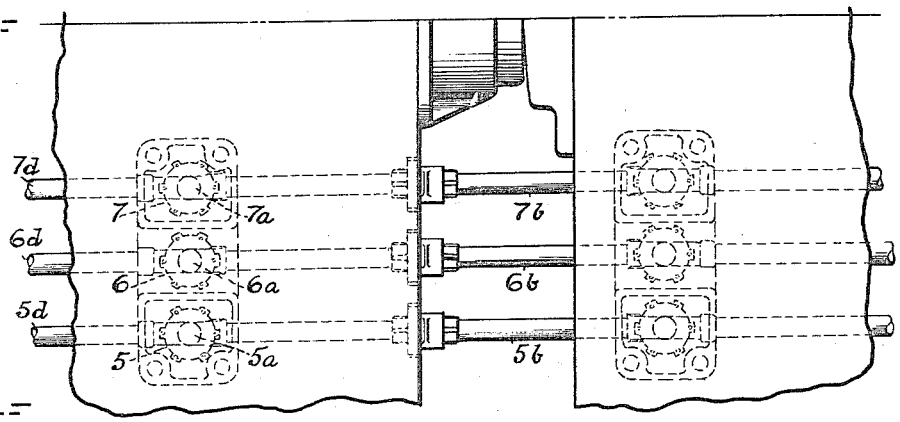
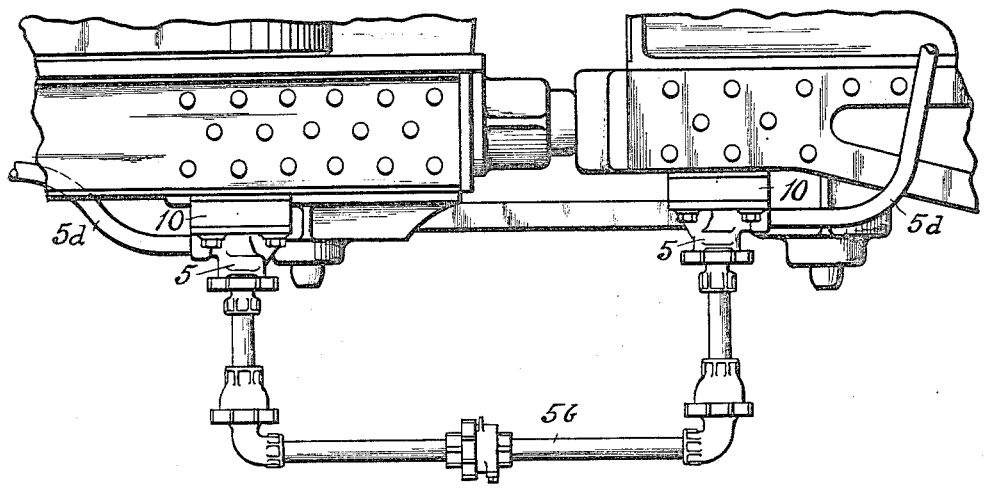
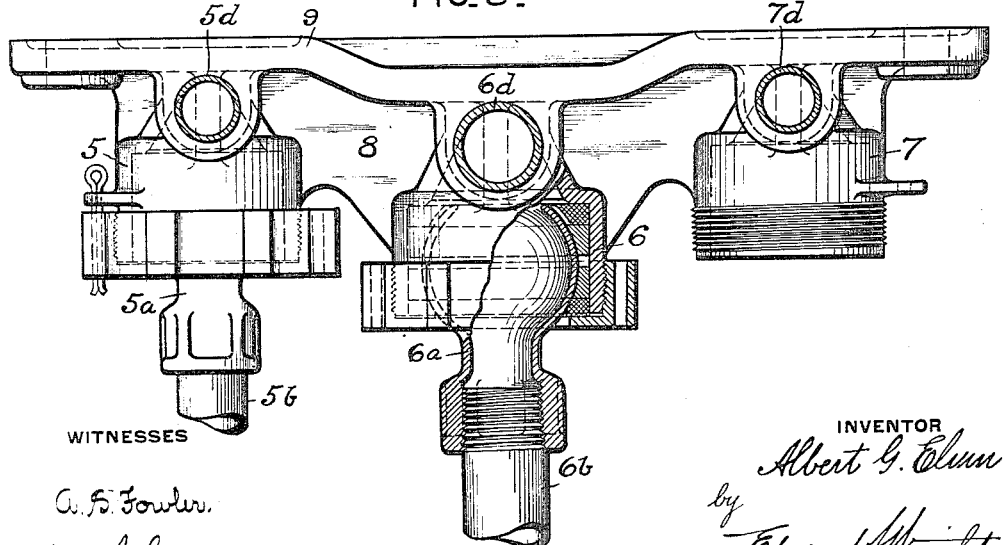

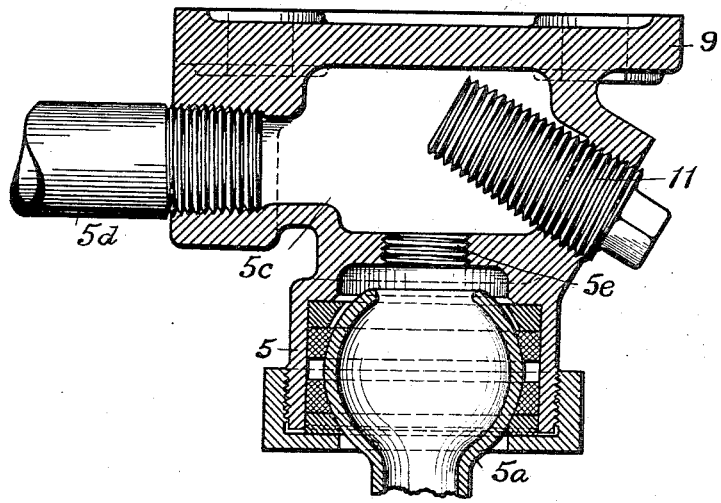
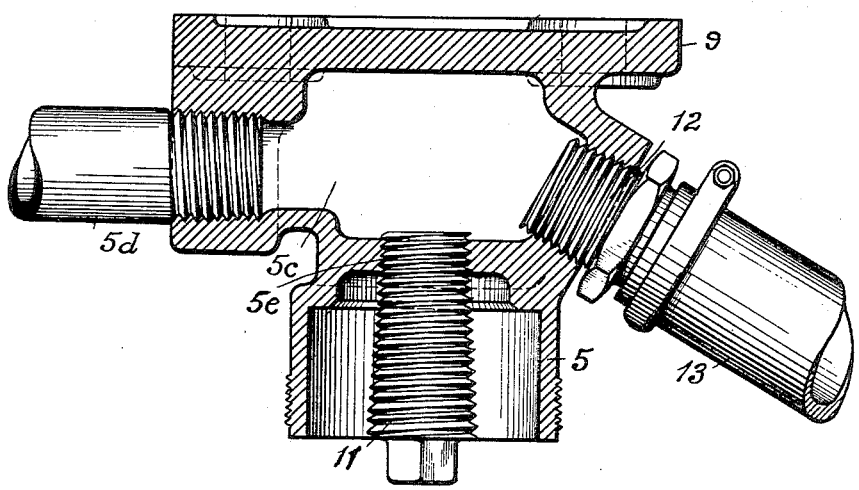

ALBERT G. ELVIN, OF SOMERVILLE, NEW JERSEY, ASSIGNOR TO FRANKLIN RAILWAY SUPPLY COMPANY, OF WILMINGTON, DELAWARE, A CORPORATION OF DELAWARE.

PIPE-COUPLING BRACKET.

1,235,300.      Specification of Letters Patent.      Patented July 31, 1917.

Application filed December 10, 1913. Serial No. 805,722.

*To all whom it may concern:*

Be it known that I, ALBERT G. ELVIN, a citizen of the United States, residing at Somerville, in the county of Somerset and State of New Jersey, have invented a certain new and useful Improvement in Pipe-Coupling Brackets, of which improvement the following is a specification.

This invention relates to flexible pipe connections for railway vehicles and is particularly designed for use on locomotives and tenders where it is necessary to establish several flexible fluid pressure conduits between the vehicles.

As heretofore used, the separate conduits have been fastened to the vehicle sills by individual clamps which often become loose, and are spaced at irregular distances apart, and the main object of my invention is to provide an improved rigid manifold bracket having a plurality of flexible ball or other joints spaced at the desired standard distance apart, for supporting the respective conduits and adapted to be securely fastened to the sills of the vehicles.

The improvement claimed is hereinafter fully set forth.

In the accompanying drawings: Figure 1 is a side elevation of a flexible pipe coupling between a locomotive and tender, and embodying my improvement; Fig. 2, a plan of the same; Fig. 3 an end view showing, in elevation, one of the improved manifold brackets upon a larger scale; Fig. 4, a transverse section of the bracket taken through one of the joints and showing a threaded plug closing the opening for an emergency hose connection; and, Fig. 5, a similar section showing the emergency hose connected to the bracket with the ball joint removed and the plug closing the opening thereto.

According to the construction shown in the drawings, my improvement comprises a manifold bracket formed preferably in one rigid piece or casting having a plurality of socket members, 5, 6, and 7, connected by a web, 8, and a flanged base portion, 9, adapted to be securely bolted to the end sills, 10, of the locomotive and tender or other railway vehicles. These socket sections for the ball or other flexible joints are spaced at suitable standard distances apart, thereby establishing a standard spacing of the several fluid pressure conduits, which greatly facilitates the interchange of vehicles, as changing from one tender to another.

With the separate clamps for individual conduits, it is practically impossible to maintain any fixed standard of spacing between the same.

The ball or other movable members, $5^a$, $6^a$, and $7^a$, are secured in the respective socket members, by packing gaskets and gland nuts, the same being connected to the corresponding joints on the adjoining vehicle by the respective pipes, $5^b$, $6^b$, and $7^b$, forming the several conduits and containing any desired number of other flexible joints. The ball members of the joints are adapted to be inserted into the respective socket members from below, and a cored passage, $5^c$, etc., from each socket is formed in the manifold casting and extends to the rear side thereof, where it is tapped to receive the corresponding pipe connection, $5^d$, etc., on each vehicle.

Any desired number of pipe connections may be made in this manner, three being shown in the drawing, and the intermediate socket section is preferably formed to project below the others in order that the wrench may be readily applied for screwing up the gland nut without interfering with the adjacent joints.

For the purpose of providing an emergency coupling which may be used temporarily in case of an accident of any kind to one of the flexible pipe connections, a threaded opening is formed in the front wall of the cored chamber, $5^c$, and the same is normally closed by a long tapered threaded plug, 11, which may be removed when it is desired to connect a threaded nipple, 12, of an emergency hose, 13, as shown in Figs. 4 and 5.

When for any reason the flexible pipe connection, $5^b$, becomes broken or inoperative, the ball section, $5^a$, is removed from the socket section, 5, the plug, 11, being then screwed up into the threaded opening, $5^e$, for closing communication from the pipe chamber, $5^c$, to said socket section, and the emergency hose, 13, is attached by means of its nipple, 12, to the pipe chamber, as indicated in Fig. 5, thus making a temporary pipe connection between the adjoining vehicles, which may be used until the flexible pipe joints are repaired. The removable plug, 11, is preferably made of sufficient length to be operated by a wrench when turned outside of the socket section, 5. This feature of my improvement is of particular advantage in connection with a bracket having a plurality of conduits, since in the event of the failure of the flexible pipe joints for one of said conduits, such emergency hose connection may be readily made for that conduit without in any way disturbing the manifold bracket and the connections for the other conduits.

Having now described my invention, what I claim as new and desire to secure by Letters Patent is:

1. In a pipe coupling for railway vehicles, the combination with a plurality of separate conduits, of a manifold bracket having an integral base portion adapted to be secured to a vehicle, and one member of a flexible joint for each conduit supported on said bracket opposite said base and at a fixed standard distance from the adjacent joint member.

2. In a pipe coupling for railway vehicles, the combination with a plurality of separate conduits, of a manifold bracket having an integral base portion adapted to be secured to a vehicle and having formed integral therewith and opposite said base a socket portion of a flexible joint for each conduit, and a ball section for each socket, said sockets being spaced a fixed standard distance apart.

3. In a pipe coupling for railway vehicles, the combination with a plurality of separate fluid conduits, of a manifold bracket adapted to be secured to the sill of a vehicle and comprising a casting having an integral base portion and web and containing a separate fluid chamber communicating with each conduit, and one member of a flexible joint extending downwardly from each of said chambers, said members being spaced a given standard distance apart.

4. In a pipe coupling for railway vehicles, the combination with a plurality of separate fluid conduits, of a manifold bracket having an integral base portion adapted to be secured to the sill of a vehicle and comprising a casting containing a separate fluid chamber communicating with each conduit, a plurality of socket sections formed integral with said casting extending downwardly from said base portion and spaced apart thereon, and a ball section for each socket communicating with the respective fluid chambers of the casting.

5. In a pipe coupling for railway vehicles, the combination with a fluid conduit, of a casting adapted to be secured to the vehicle sill and containing a chamber communicating with said conduit, a flexible joint member communicating through a threaded opening with said chamber, said chamber having a threaded opening for attaching a nipple for an emergency hose, and a removable plug normally closing said opening, but adapted to be inserted to close the threaded opening from said chamber to the joint member when the emergency hose is connected.

6. In a pipe coupling for railway vehicles, the combination with a fluid conduit, of a casting adapted to be secured to the vehicle sill and containing a chamber communicating with said conduit, a socket section communicating with said chamber through a threaded opening, said chamber having a threaded opening for attaching an emergency hose, and a removable threaded plug of greater length than the socket section, normally closing the threaded emergency opening of said chamber but adapted to be inserted in the threaded opening of the socket section when the emergency hose is connected.

7. In a pipe coupling for railway vehicles, the combination with a plurality of fluid conduits, of a manifold bracket adapted to be secured to the sill of a vehicle and comprising a casting containing a separate fluid chamber communicating with each conduit, and a socket section communicating with said chamber, said chamber having an opening for attaching an emergency hose, and a removable plug normally closing said opening but adapted to be inserted to close communication from the chamber to said socket when the emergency hose is connected.

8. A connecting device between two sections of a train, comprising two hollow terminal pieces, one connected with each section, said terminal pieces each provided with a chamber, each terminal piece provided with two openings leading from the exterior thereof to said chamber, a hollow metallic connection consisting of rigid pieces flexibly connected together and connecting with one opening in each terminal piece, removable closing devices for closing the other of said openings in said terminal pieces and a supplemental hollow connection separate from said terminal pieces and adapted to be connected therewith when the metallic connection becomes injured, by removing said closing devices and connecting the ends of the hollow supplemental connection with the terminal pieces through the holes from which they are removed.

9. A connecting device between two sections of a train, comprising two terminal pieces, one connected with each section, said terminal pieces each provided with a chamber, each terminal piece provided with three openings leading from different directions to said chamber, a permanent hollow connection connecting with one of said openings in each of said terminal pieces, a supplementary temporary connection, a conducting pipe connecting with one of said openings in each of said terminal pieces, and a removable closing device for each of the other openings in said terminal pieces, and means for connecting said terminal pieces with the supplementary temporary connection through the openings having the removable closing devices when the permanent connection is injured.

In testimony whereof I have hereunto set my hand.

ALBERT G. ELVIN.

Witnesses:
F. W. MARTIN,
A. T. DENNELLEY.